April 3, 1962

W. M. BOREN ETAL 3,027,763

METERING SEPARATOR

Filed March 11, 1957

Robert K. Franklin
William M. Boren
Robert G. Oliphant
INVENTORS

BY Frank B. Pugsley

ATTORNEYS

April 3, 1962

W. M. BOREN ETAL 3,027,763

METERING SEPARATOR

Filed March 11, 1957

Robert K. Franklin
William M. Boren
Robert G. Oliphant
INVENTORS

BY Frank B. Pugsley

ATTORNEYS

United States Patent Office 3,027,763
Patented Apr. 3, 1962

3,027,763
METERING SEPARATOR
William M. Boren, Robert K. Franklin, and Robert G. Oliphant, Houston, Tex.; said Boren and said Oliphant assignors to Rolo Manufacturing Company, Houston, Tex., a corporation of Texas
Filed Mar. 11, 1957, Ser. No. 645,163
3 Claims. (Cl. 73—200)

Our invention relates to a multiple functioning metering separator primarily adapted for use in separating aqueous fluid produced from an oil well into its primary constituents of oil, water and gas, and metering the two liquid components, oil and water.

In the operation of a producing well, it is preferable to separate the well fluid into its primary parts as soon as possible after removal from the ground. This allows ready disposal of the undesirable fluids such as water, if any, and renders the valuable fluids ready for metering and storage or further treatment.

This practice has created a demand for self contained automatic units which can perform the aforementioned operations at or near the well site. Dual functioning units are presently available to separate liquids from gases and concurrently meter the liquids. In an installation where an aqueous well fluid is produced, it is a frequent practice to include a device for removing the free water before an attempt is made to meter the useful petroleum. It is desirable to maintain a record of the amount of water so removed in order to establish a water-oil ratio for the raw well fluid, and this requires additional apparatus for water metering purposes. It becomes apparent that a well fluid processing system comprising several elements may be necessary to render aqueous well fluids suitable for storage, refining or shipping.

Therefore, it is an object of our invention to provide an individually housed, multiple functioning unit for gravity separation of an aqueous well fluid and measurement of the liquid portions thereof.

It is also an object of our invention to provide, for use in the above described operation, a "neutral" position three-way valve which provides accurate and positive flow control for metering.

It is a further object of our invention to provide a well fluid processing unit of the described type which is automatic in operation, accurate, dependable and economical.

Other objects and advantages of our invention will become apparent from the attached drawings and specification in which one embodiment is pictured and described.

In carrying out our invention, we employ a processing unit which includes a gravity separation chamber and two automatic flow controlled metering chambers which measure the separated fluids as they become available.

Referring now to the attached drawings, FIG. 1 is a front elevational view, partly in section, of our metering separator;

Figure 1:
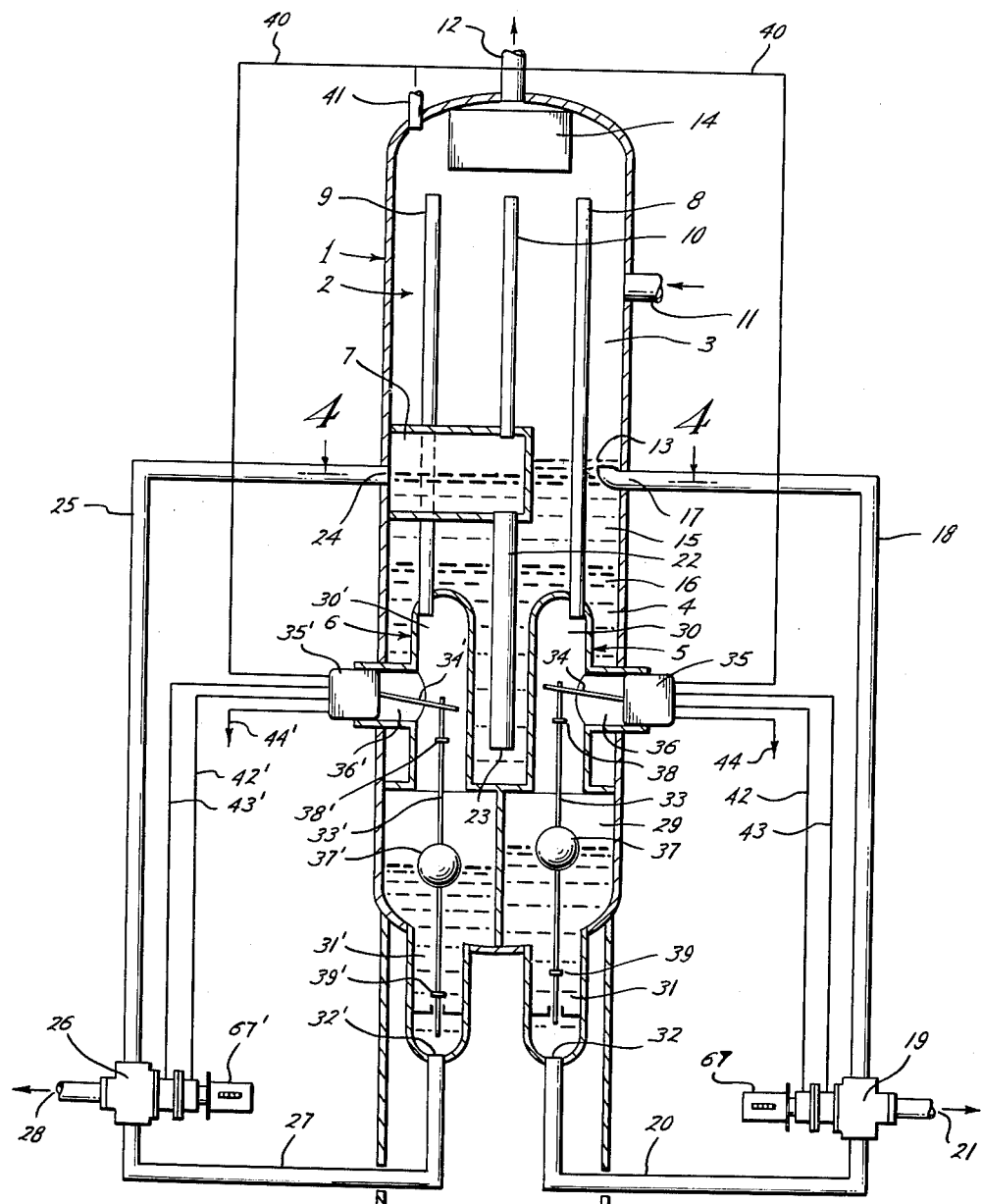

Referring still to the drawings and particularly to FIG. 1, the numeral 1 indicates the over-all unit housing, a completely sealed, weatherproof unit. Within the housing is a main chamber 2, the upper section 3, 4 of which comprises the separating chamber for gases and liquids, and the lower section of which, beneath transverse, upwardly pocketed baffle means 70, forms two completely sealed chambers, the oil metering chamber 5 and the water metering chamber 6 separated by upright wall 71. An additional fluid chamber 7 is provided in the upper section of the housing. Each of the chambers 5, 6 and 7 within the unit housing 1 is vented to the upper section part 3 of the main chamber 2. These equalizer lines, designated 8, 9 and 10, respectively, provide internal pressure relief conduits to allow flow between chambers. The direction and control of such internal flow will be made apparent in subsequent paragraphs.

For clarity, the operation of our unit will be described as comprising three phases, the first or separation phase, and the second and third, or oil and water metering phases, respectively. However, the over-all function of the metering separator is continuous, as will become apparent, and the manner of description is not intended to imply that there are clear lines of distinction between the operations. They are mutually dependent, and parts of an integrated whole.

The aqueous well fluid is introduced into the upper section 3 of the main chamber through well fluid inlet 11 to begin the first or separation phase of operation. The separation of the gases from the liquids takes place as the gas rises to the top of the upper part 3 of the upper housing section and is released or drawn off from gas outlet 12. The liquid portions of the fluid simultaneously fill the lower part 4 of the upper section, surrounding and rising above wall means 70 and the upper portions of chambers 5 and 6. Locating the inlet 11 above the liquid level line 13 aids in the rapid separation of the gases by providing a space through which the incoming well fluid must fall. During this period gases may readily escape. A mist extractor 14 of conventional design is located within the main chamber 2 immediately below the gas outlet 12 to aid in the process of removing moisture from the gas.

The liquid separation phase occurs in the lower part 4 of the upper section as the water separates from the oil by gravity, each seeking its own level. Consequently, the liquid in the lower part 4 will be comprised of oil and unseparated emulsion 15 on the top and water 16 below.

The second and third phases of the operation of our metering separator involve concurrently metering the two liquid constituents of the well fluid and releasing the metered fluid into discharge lines. The two operations begin independently of each other in metering chambers 5 and 6 as the separated liquids in lower section 4 reach the level of their respective outlets. The oil outlet 17 opens into the upper section through a port located at a point sufficiently high on the housing wall to insure that only substantially water-free oil is drawn off. Oil so removed passes through the oil outlet duct 18, three-way oil valve 19, and inlet-outlet oil conduit 20 into oil metering chamber 5. Thereafter, as will be explained, it returns through inlet-outlet oil conduit 20, three-way oil valve 19, and out of the unit through oil discharge line 21.

The separated water in the lower part 4 of the main chamber upper section enters the intermediate chamber 7 through the downpipe 22 which opens into and near the bottom of the sump between upward extensions 30 and 30' of the metering chambers. The open lower end 23 of the downpipe is near the bottom of the lower sections 4. This arrangement insures that only the fluid at the bottom of the lower section, free water under normal operating conditions, can move upward through the downpipe into the intermediate chamber 7. The fluid in intermediate chamber 7 passes through water outlet port 24 from whence it moves through water outlet line 25, three-way water valve 26, and inlet-outlet water conduit 27 into the water metering chamber 6. Thereafter, as will be explained, it returns through inlet-outlet water line 27, three-way water valve 26 and out of the unit through water discharge line 28.

This unit is designed to handle a well fluid in which water is present in an amount varying over a wide range. However, a safety feature is provided to prevent admixture of oil and water in the metering chambers, even though the raw well fluid should become either completely free of water, or completely free of separable oil.

In the first event, a sudden decrease or failure of water in the well fluid, the water already present in the bottom of the upper section of the main chamber 2 will act as a trap and prevent any oil entering the open lower end 23 of downpipe 22. Due to the difference in specific gravity of the two fluids, the column of oil in the main chamber 2 will rise to a level somewhat higher than that of the water in chamber 7. Therefore, oil will reach a discharge level at oil outlet 17 while the water level is still somewhat below water outlet 24 if these outlets are at the same level. Thus some volume of water surrounding the lower end 23 of downpipe 22 will be preserved to maintain the water trap.

In the second event, a sudden decrease or failure of oil in the well fluid, the above mentioned difference in specific gravities would tend to keep the oil level in lower section 4 at a point slightly above the water level in chamber 7. In case of a substantially diminished percentage of oil in the well stream with the outlets 17 and 24 at the same elevation the oil would be discharged more rapidly than supplied and ultimately water would reach the oil outlet. This danger may be minimized or even fully avoided in our invention by placing the oil outlet level slightly above the water outlet level. Thus, even with no oil present in the main chamber, the discharge would be entirely through the water outlet so long as the water discharge line is of sufficient size to handle the full flow of liquid entering the unit through inlet 11.

The respective elevations of oil outlet 17 and water outlet 24 is subject to a definite limitation. If their difference in elevation results in the column or head of oil being greater than the effective water column in pipe 22 and chamber 7 by a percentage greater than the percentage difference between the specific gravities of the water and oil, the versatility and reliability of the unit will be reduced. This is because, under some oil to water ratio conditions, the water plug in pipe 22 may be eliminated and oil will escape through the water opening. Therefore the water outlet must be either at the same elevation as the oil outlet, an arrangement which will function satisfactorily for all types of raw well liquids except those which are substantially all water, or at a small distance below the oil outlet as described above. In other words, the ratio of the vertical distance from the downpipe entrance 23 to the oil and water outlets, respectively, should not exceed the ratio of the specific gravity of water to oil. Thus in the preferred form of our invention, as shown in FIG. 1, the water and oil outlets 17 and 24 are so designed that the effective height of water outlet 24 is slightly below the entrance to oil outlet 17.

The separated liquids flow by gravity into and out of the metering chambers 5 and 6. As the operations of the two chambers are substantially identical, one explanation will suffice for both. However, it is to be understood that the two metering operations are separate and distinct from each other, each occuring only as sufficient liquid becomes available through outlets 17 and 24 to operate the respective metering means. Referring still to FIG. 1, those parts common to both systems are identified by the same reference numerals, with the water system parts differentiated from the oil system parts by the addition of a prime mark to the appropriate numeral (n').

For purposes of illustration the operation of the oil metering system will be described. The oil metering chamber has a central enlarged portion 29 and a vertically aligned upwardly extending portion 30 and downwardly extending portion 31. The chamber inlet 32, connected to inlet-outlet oil line 20, is near the bottom of the lower portion 31. A rod 33 extends vertically within the metering chamber, including the extensions 30 and 31 thereof, and has its upper end pivotally attached to the end of the actuating arm 34. The actuating arm is attached to the pilot valve 35 which is mounted within a sideward extension 36 on the upward portion 30 of the chamber. While the pilot valve is shown mounted within the metering chamber, it is obvious that such mechanism may be located outside the chamber with the actuating arm extending outwardly through the wall of the chamber.

As indicated above, the flow of liquids into and out of the metering chambers is controlled by the three-way valves 19 and 26. The internal porting of these valves will be explained later, but for the purpose of describing the operation of the metering chambers, the two positions of these valves will be referred to as the chamber filling position in which flow is directed from the appropriate outfall line 18 or 25 to the corresponding inlet-outlet line 20 or 27, and the chamber emptying position in which flow is directed from the appropriate inlet-outlet line 20 or 27 to the corresponding discharge line 21 or 28. Again referring to the oil metering system for illustration, with the valve in the chamber filling position, a float 37, slidable upon the rod 33, moves upward as oil rises within the chamber. As the float rises within the chamber, it engages an upper collar 38 fixed upon the rod 33. Thereafter, further rise of the float lifts the rod and the associated arm and hence actuates the pilot valve. The change in position of the pilot valve moves the three-way valve 19 to the chamber emptying position, as will be made apparent, and the liquid level in the chamber begins to fall. As the float falls with the surface of the liquid discharging from the metering chamber, it enters the downward portion 31 and engages the lower collar 39 fixed on the rod. With further lowering of the liquid level the float pulls the rod downward to return the pilot valve 35 to its original position, thereby restoring the three-way valve to the chamber filling position. The volume of fluid which discharges from the chamber during the chamber emptying portion of the cycle is dictated by the distance between upper collar 38 and lower collar 39. The total number of operating cycles thus accomplished represents the total volume of liquid discharge from each meter in terms of the number of unit volumes measured.

Figure 3:
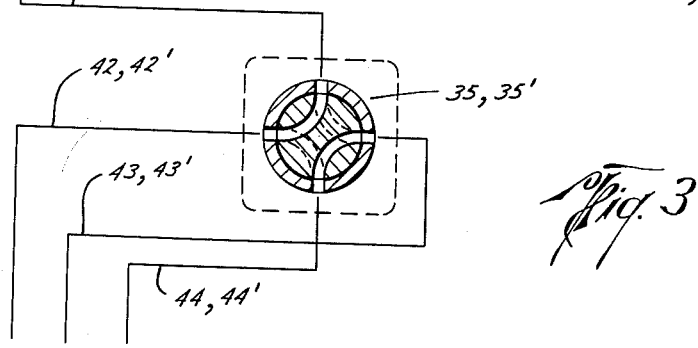
FIG. 3 is a diagrammatic view of a suitable metering pilot valve.
Figure 4:
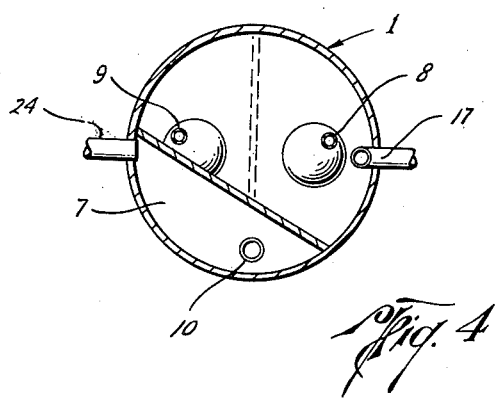
FIG. 4 is a horizontal sectional view of our separator at lines 4—4 of FIG. 1.

Referring now to FIGS. 1 and 3, the operating relationship of the pilot valves and three-way valves will be explained. As indicated above, both the oil and water systems are identical in operation, and the following description which is directed to the oil system should be understood to be equally applicable to the water system. Pilot valve 35 controls the direction of the liquid or gas pressure from line 40. The source of this pressure is shown in FIG. 1 to be the auxiliary gas outlet 41 in the upper portion of chamber 2, an arrangement by which the gas pressure within the unit is utilized to operate each of the valves. However, any suitable source of a nominal amount of liquid or gas pressure will serve as well. This pressure, introduced to both pilot valves through line 40, is directed alternately in the oil system through pilot lines 42 and 43 to opposite sides of a reciprocating diaphragm within three-way valve 19. What has been described as the chamber filling position of the three-way valve results from the pilot valve directing pressures through line 42 to the appropriate side of the diaphragm, as will be explained, while it simultaneously relieves line 43 through exhaust line 44. This position is illustrated by the heavy lines in FIG. 3. When the float engages upper collar 38 and lifts actuating arm 34, the pilot valve changes position and the pressure is directed through line 43 to the opposite side of the three-way valve diaphragm. In this second position, illustrated by dotted lines in FIG. 3, the pressure in line 42 is relieved through exhaust line 44, and the three way valve 19 moves to its second or chamber emptying position, in a manner to be explained, in which the metering chamber is opened to its discharge line. When the flat within the metering chambers falls to the point at which it contacts lower collar 39 and depresses actuating arm 34, the pilot valve returns to its former position with line 42 pressurized and line 43 exhausting through line 44. This change in direction of application of the pressure returns the three-way valve to its former chamber filling position, ready to renew the cycle.

It is apparent that the structure of the pilot valve could be modified in a number of ways without varying its method of operation. Therefore, we do not wish to limit ourselves to the structure shown in FIG. 3 which represents but a single illustration of appropriate fluid pressure direction control means.

Figure 2:
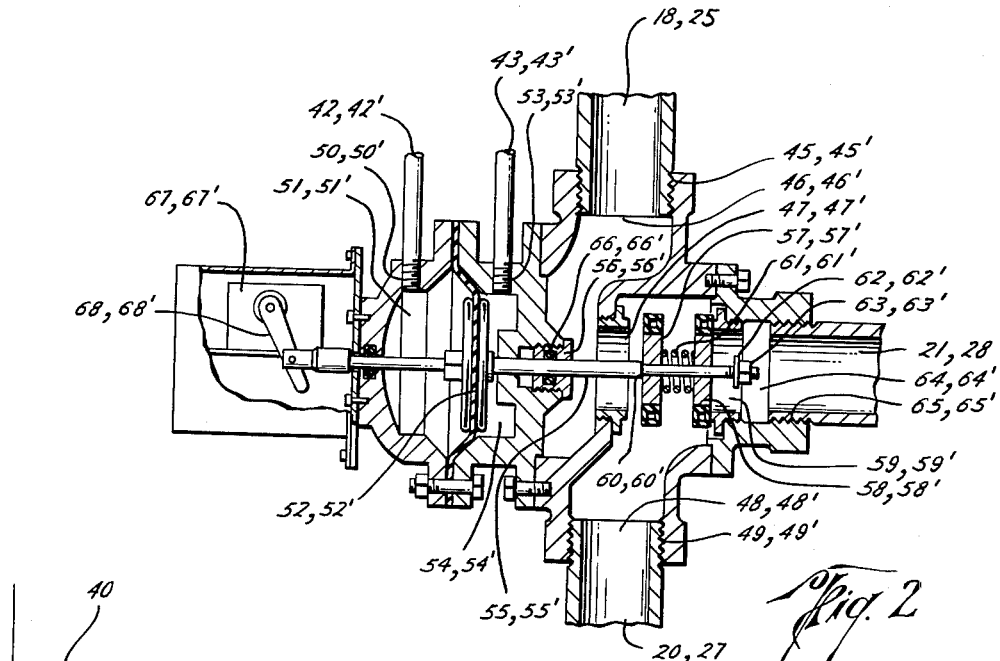
FIG. 2 is an enlarged front elevational view, also partly in section, of one of the two three-way valves which direct and control the two metering operations of our separator.

The design of the metering three-way valves 19 and 26 is an integral part of our invention. As they are identical in structure and operation, the following explanation is applicable to both. The convention described above with regard to numerical designations is continued in FIG. 2, to which reference should be had for understanding of this valve.

In the oil metering system oil line 18 is threadably or otherwise connected at 45 to the valve inlet 46 of three-way valve 19. With the valve initially in what has been described as its chamber filling position, flow moves from inlet 46, through valve port 47 and valve opening 48 and into the metering chamber through inlet-outlet oil line 20, which is threadably or otherwise connected to three-way valve 19 at 49. The three-way valve may be placed directly below the metering chamber to shorten or eliminate the inlet-outlet line 20.

The valve is maintained in this position by the pressure in pilot line 42 acting through pressure port 50 into chamber 51, adjacent one side of diaphragm 52. The valve remains in this position until fluid or gas pressure is relieved in line 42 and directed through pilot line 43 where it moves through pressure port 53 into chamber 54 adjacent the other side of the diaphragm 52. At this time the diaphragm will reciprocate to its other position, thereby moving valve stem 55 longitudinally through valve stem guide 56 and directing valve member 57 against valve port 47. Immediately thereafter, in the same valve stem movement, valve member 58 is pulled away from valve port 59.

This sequence of operation results from the fact that valve members 57 and 58 are not fixed to valve stem 55 but are slidable thereon within certain limits. In the chamber filling position, shoulder 60 on valve stem 55 acts against valve member 57 to hold it away from port 47. As valve stem 55 begins its longitudinal movement, compression spring 61, acting between the two valve members, forces member 57 to follow the shoulder 60 until it seats against opening 47. As the stem continues to move, valve member 58 is contacted by washer 62 on the free end of the valve stem and pulled away from port 59. The washer, secured by nut 63, and the shoulder 60, limit the movement of the valve members on the stem. At the conclusion of the above described operation, a channel of flow is open from the metering chamber 5 through inlet-outlet oil line 20, valve opening 48, valve port 59, and thence through valve outlet 64 into the oil discharge line 21, which is threadably or otherwise connected to the valve at 65. This flow condition, which has been described as the chamber emptying valve position, continues until such time as pilot valve 35 redirects the pilot pressure fluid into pilot line 42 and relieves the pressure in pilot line 43, at which time the valve will return to its former or chamber filling position.

The sequence in which the valve ports 47 and 59 open and close is an important part of my invention. During a single stroke of valve stem 55 there is a moment at which both ports are closed. This "neutral position" provides positive assurance that no fluid will bypass the metering chamber and escape unmeasured into the discharge line.

The portion of the valve which houses the diaphragm is sealed from the portion in which flow occurs by an annular seal 66 within the valve stem guide 56 which permits sliding movement of the valve stem 55 but prevents leakage.

At the end of the valve stem opposite the valve members is a counter 67. Each movement of the valve stem in response to a change in the diaphragm position is transmitted to the counter by means of counter arm 68 which is attached to the shaft. Movement in one direction cocks the counter and movement in the other direction trips it to record one unit of volume. Thus, each cycle of operation comprising one filling and one emptying of the chamber is tabulated by the counter. The cumulative total indicated by the counter represents the number of unit volumes which have passed through the interrelated chamber.

The operation of this system as described is completely automatic. Each of the metering chambers will fill and empty in response to the position of the three-way valve, whose position is in turn dictated by the position of the pilot valve. The floats thus operate the systems while the counter mechanisms provide silent and accurate recording observers.

It is obvious that many changes could be made in our invention by one skilled in the art to which it pertains without departing from the spirit thereof. Therefore, it is desired to protect by Letters Patent all forms of the invention falling within the scope of the following claims.

We claim:

1. A metering separator comprising a housing having an upper and a lower portion, two separator chambers within said upper portion, each of said chambers being in open communication with said upper portion at its top, said chambers being interconnected adjacent their bottoms, an inlet into the upper portion of said housing adapted to discharge into one of said separating chambers, outlets from said separating chambers adjacent the tops thereof and at substantially similar elevations, two similar metering systems, each comprising a metering chamber disposed within the lower portion of said housing and having an inlet opening a relief conduit interconnecting said metering chamber and said upper portion of said housing above said separator chambers a valve comprising a valve housing having a valve chamber therein; an inlet port connecting said valve chamber to one of said separating chamber outlets; a discharge port disposed opposite to said inlet port and in axial alignment therewith; an entrance-exit port intermediate said inlet port and said discharge port connecting said valve chamber to one of said metering chamber openings; an elongate valve stem disposed coaxially within said inlet port and said discharge port, said valve stem being movable longitudinally therethrough; a pair of stops extending radially from said valve stem, said stops being spaced a distance apart substantially equal to the distance between said inlet port and said entrance-exit port; two valve closing members slidably carried on said valve stem between said stops within said valve chamber, one of said valve closing members being adapted to seat against and close said inlet port and the other of said valve closing members being adapted to seat against and close said discharge port; resilient means disposed between said valve closing members to bias yieldingly said valve closing members against said valve stem stops; valve operating means operatively connected to said valve stem and adapted when activated to produce reciprocating longitudinal movement thereof; and valve control means operatively interconnecting said valve operating means and said one metering chamber, said valve control means being adapted to activate said valve operating means in response to the rise and fall of the fluid level in said metering chamber within predetermined limits.

2. A metering separator for a volatile mixture of liquids of different specific gravities comprising a unitary housing, wall means traversing said housing and forming upper and lower sections therein, an outlet for gaseous matter and an inlet for volatile mixture in the wall of said upper section, said inlet being below the level of said outlet, partition means in said housing lower section forming side by side metering chambers therein, said wall means having a pair of upward pockets forming upward extensions of said metering chambers and forming a sump therebetween, inlet and outlet conduit means extending from each of said metering chambers, a discharge line for each of said chambers, an overflow port in the wall of said upper section below said inlet, an outlet duct leading from said port to one of said chamber inlet conduit means, a second outlet duct leading from a point near the bottom of said sump thence to the other chamber inlet conduit means, valve means, respectively, connecting the outlet duct and inlet conduit means and the discharge line and outlet conduit means for each of said metering chambers, and a variable volume responsive device in each of said metering chambers operatively connected to said valve means for alternatively opening the communication between each of said metering chambers and the connected outlet duct, while closing the communication between each of said metering chambers and the connected discharge passage, and reversing said communications.

3. A metering separator for a mixture of liquids comprising a casing forming a settling chamber having an inlet, a metering chamber means formed in said casing below said settling chamber, an outlet in said chamber for the lighter liquid, a duct connecting said outlet to said metering chamber means, an outlet duct for the heavier liquid leading from a region of said settling chamber substantially below said outlet, a three-way valve interposed in each of said ducts, and volume responsive devices in said metering chamber means operatively connected to said valves, each of said valves having spaced connections for the connected duct portions, a valve chamber therebetween, a discharge connection between said first-mentioned connections, inlet and outlet valve seats, respectively, for said first-mentioned connections, a valve actuator connected to said level responsive means, and a pair of valves having resilient, lost motion connections to said actuator for alternately opening and closing said seats, said one-way connection being constructed and arranged to cause both of said valves to close simultaneously for a brief period during each shifting thereof to positively prevent intermingling of the metered and unmetered liquid.

References Cited in the file of this patent

UNITED STATES PATENTS

| | | |
|---|---|---|
| 654,965 | Franke | July 31, 1900 |
| 745,519 | Pravicha et al. | Dec. 19, 1903 |
| 1,147,881 | Morris | July 27, 1915 |
| 2,158,381 | Raymond | May 16, 1939 |
| 2,211,282 | McKeever | Aug. 13, 1940 |
| 2,225,949 | Bennett | Dec. 24, 1940 |
| 2,306,606 | Hirsch | Dec. 29, 1942 |

OTHER REFERENCES

Emulsion Treater Type "A" Bulletin TBA–1, published by Sivalls Tanks, Inc., 2200 East Second Street, Odessa, Texas, Oct. 1, 1949, 8 pages, page 1 pertinent. Copy in Div. 94, 183–2.75.

Composite Catalogue of Oil Field and Pipeline Equipment 19th 1952–53 Edition, vol. 2 J to Z, published by World Oil, The Gulf Publishing Co., Houston, Texas, 1952, page 4493. Copy in Scientific Library, TN/871.5/C6.